United States Patent [19]

Kiya et al.

[11] Patent Number: 4,812,964
[45] Date of Patent: Mar. 14, 1989

[54] SIGNAL TRACING CONTROL SYSTEM FOR PMC

[75] Inventors: Nobuyuki Kiya, Hachioji; Shuji Toriyama, Kawasaki; Yoshiharu Saiki, Hachioji, all of Japan

[73] Assignee: Fanuc Ltd., Minamitsuru, Japan

[21] Appl. No.: 140,260

[22] PCT Filed: Apr. 10, 1987

[86] PCT No.: PCT/JP87/00224
§ 371 Date: Nov. 25, 1987
§ 102(e) Date: Nov. 25, 1987

[87] PCT Pub. No.: WO87/06365
PCT Pub. Date: Oct. 22, 1987

[30] Foreign Application Priority Data

Apr. 15, 1986 [JP] Japan ............................... 61-086918

[51] Int. Cl.⁴ .................... G06F 11/30; G11C 29/00
[52] U.S. Cl. ................................ 364/140; 364/200;
364/900; 364/474.03; 364/550; 371/16; 371/19;
371/21
[58] Field of Search .............. 364/140, 200 MS File,
364/900 MS File, 474.03, 300, 200, 737, 738,
550; 324/149; 371/16, 19, 21

[56] References Cited

U.S. PATENT DOCUMENTS

| 4,063,311 | 12/1977 | Jeremiah et al. | 364/900 |
| 4,195,770 | 4/1980 | Benton et al. | 371/21 |
| 4,200,936 | 4/1980 | Borzcik et al. | 364/900 |
| 4,590,550 | 5/1986 | Eilert et al. | 371/16 |
| 4,598,364 | 7/1986 | Gum et al. | 364/300 |
| 4,639,917 | 1/1987 | Furuta | 371/16 |
| 4,757,503 | 7/1988 | Hayes et al. | 371/21 |

Primary Examiner—Jerry Smith
Assistant Examiner—Paul Gordon
Attorney, Agent, or Firm—Staas & Halsey

[57] ABSTRACT

A signal tracing control system provided in a programmable machine controller (PMC) which controls a machine in response to a signal from a numerical control apparatus. A signal of a monitored RAM (1) is monitored for a change by a monitoring circuit (21). When a signal change is detected by the signal monitoring circuit (21), it applies a signal to a writing control circuit (22) which then writes the data of the monitored RAM (1) into a tracing buffer (2). This cycle of operation is repeated. Thus, only when a data item in the monitored RAM (1) is changed, is the signal traced. Effective signal tracing can therefore be effected with a small memory capacity.

6 Claims, 3 Drawing Sheets

SIGNAL TRACING CONTROL SYSTEM FOR PMC

BACKGROUND OF THE INVENTION

The present invention relates to a signal tracing control system for a programmable machine controller PMC, and more particularly to a signal tracing control system for a PMC which is capable of storing data in a tracing buffer having a small capacity.

When trouble occurs during software development or operation of a controlled device, it is necessary to know the stored contents or data items of various memories in order to investigate the cause of the trouble. In this manner, it is more important to understand dynamic conditions, i.e., the process of a change, than to know static conditions. One system for knowing dynamic conditions has been to alter the program of a control apparatus and monitor a certain signal. However, if the program of the control apparatus is stored in a ROM, it cannot be altered. A system for storing the contents of a memory for a certain period of time is known as a system for monitoring the contents of the memory.

If the contents of a memory are to be stored as they are, the capacity of a memory used to store them must be large. If a memory of a certain storage capacity is used, the time during which the memory contents are monitored is limited. Therefore, memory data responsible for the trouble may not be discovered.

SUMMARY OF THE INVENTION

It is an object of the present invention to provide a signal tracing control system for a PMC which will solve the above problems and can effect a necessary monitoring process with a small memory capacity.

To solve the above problems, there is provided a signal tracing control system in a programmable machine controller (PMC) for controlling a machine in response to a signal from a numerical control apparatus, comprising monitoring means for monitoring a change in a signal of a monitored RAM, writing control means for writing data in response to a signal indicative of a signal change from the monitoring means, and a tracing buffer for storing the data of the monitored RAM which is written by the writing control means.

Since not all data items are traced, but a signal subjected to a change is monitored, effective signal tracing can be performed with a small memory capacity.

DESCRIPTION OF THE PREFERRED EMBODIMENT

An embodiment of the present invention will hereinafter be described in specific detail with reference to the drawings.

Figure 1:
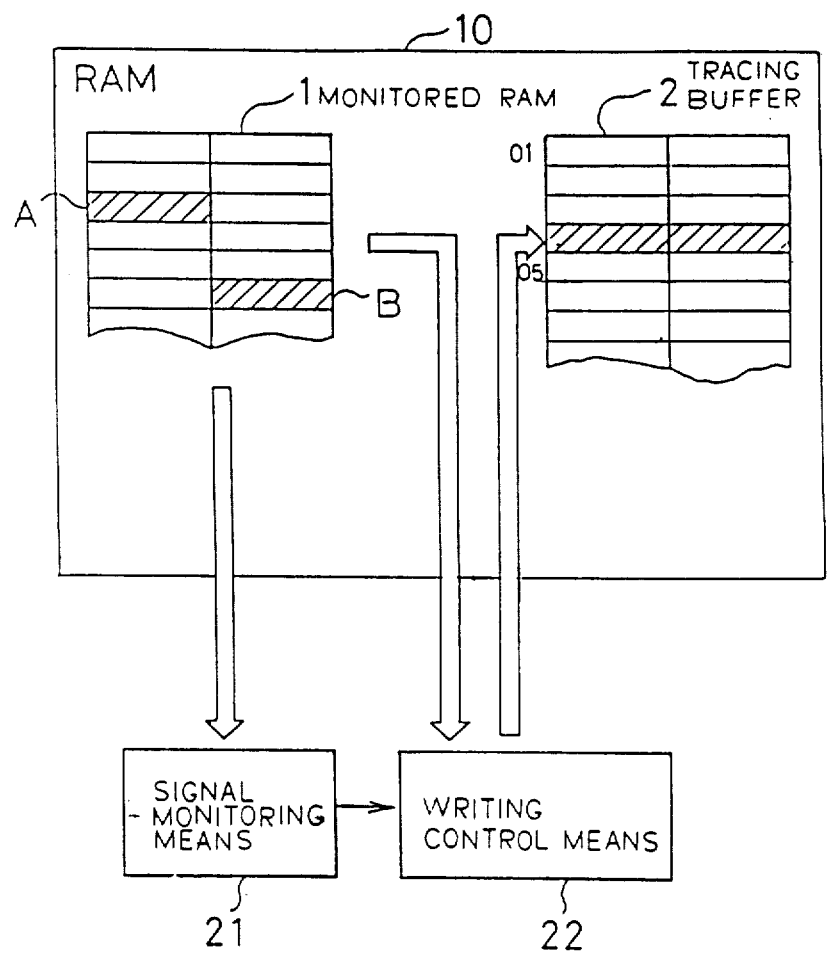
FIG. 1 is a block diagram of a signal tracing control system according to an embodiment of the present invention.

FIG. 1 is in block diagram of a signal tracing control system according to an embodiment of the present invention. A RAM 10 in a PMC includes a monitored RAM 1 and a tracing buffer 2 for storing data stored in the RAM 1. A signal monitoring means 21 monitors how the stored data in the monitored RAM 1 changes. A writing control means 22 is responsive to a signal from the monitored RAM 1 for writing the data from the monitored RAM 1 into the tracing buffer 2.

The operation of the device in FIG. 1 will now be described briefly. First, an address to be monitored in the monitored RAM 1 is selected in advance. In the illustrated embodiment, addresses A and B (which are shown as hatched portions in FIG. 1) are monitored. The signal monitoring means 21 always monitors how the signals of the addresses A and B change. If any bit of the addresses A and B is changed, the writing control means 22 applies a signal indicating a bit change to the writing control means 22. In response to the signal from the signal monitoring means 21, the signal monitoring means 21 writes the data items of the addresses A and B into the tracing buffer 2. In the illustrated embodiment, the data item of address A is written into the lefthand side of an address 04 of the tracing buffer 2; whereas the data item of address B is written into the righthand side of the address 04 of the tracing buffer 2. When any bit of the addresses A and B is changed, the data items in addresses A and B are written into an address 05 of the tracing buffer 2 in the same manner. As described above, data items of the monitored RAM 1 are written into the tracing buffer 2 only when these data items are changed.

Figure 2:
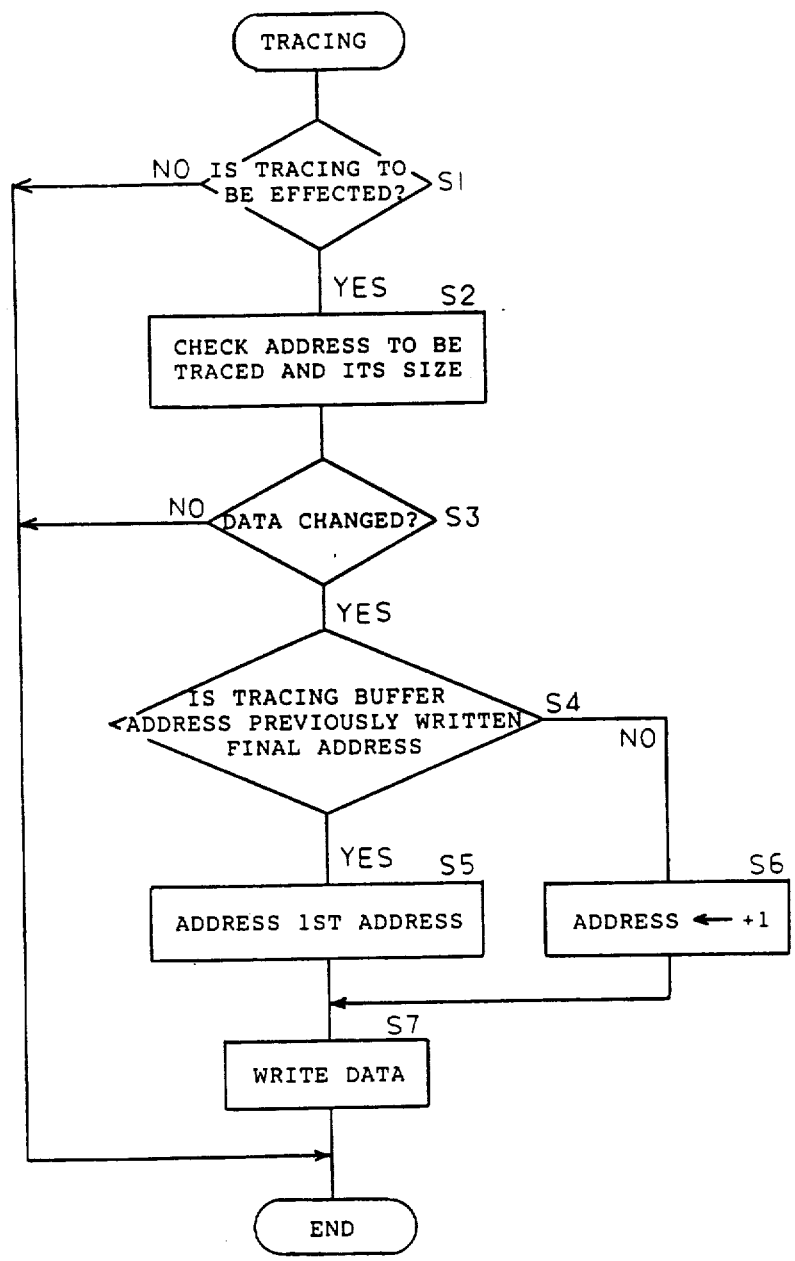
FIG. 2 is a flowchart of an operation sequence of the signal tracing control system.

An operation sequence of the above signal tracing control system will be described below with reference to the flowchart of FIG. 2. The steps of the operation sequence are denoted by S1, S2, S3, . . . .

Step S1 ascertains whether signal tracing is to be effected or not. If signal tracing is not to be carried out, an operation is not effected, and the operation sequence os brought to an end. If signal tracing is to be performed, then control goes to step S2.

The step S2 checks an address to be traced and its size. Control goes from step S2 to step S3.

The step S3 checks whether all bits of the monitored address are changed or not. If the address bits are not changed, then the operation sequence is ended. If the address bits are changed, then control proceeds to step S4.

The step S4 ascertains whether or not the address in which a data item has been written in a preceding cycle is the final address of the tracing buffer. If it is not the final address, then control goes to step S6. If it is the final address, then control goes to step S5.

In the step S5, the address is rewritten as the first address since it is the final address in the tracing buffer.

In the step S6, the address is only incremented by +1 since it is somewhere before the final address in the tracing buffer.

Then, in step S7, a monitored data item is written into the address thus determined in the tracing buffer, and the operation comes to an end.

As described above, since the tracing buffer is a ring configuration, the data items stored therein are updated and new data items are stored at all times.

Figure 3:
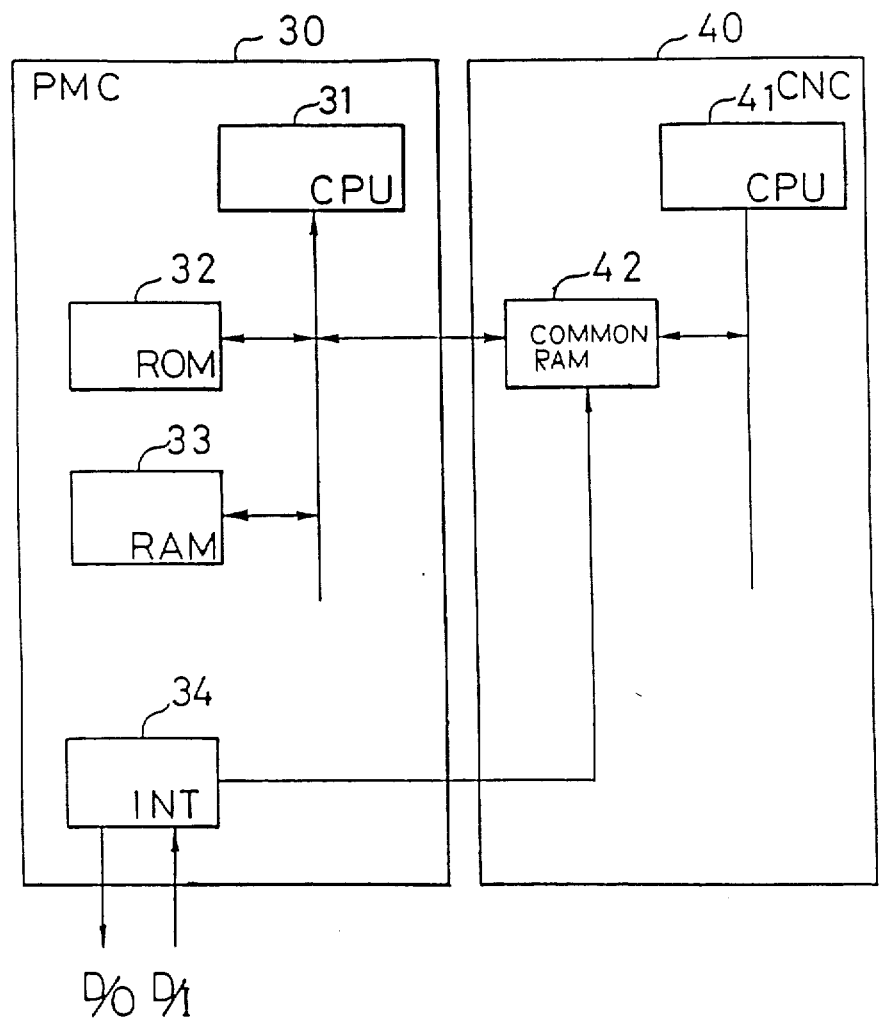
FIG. 3 is a block diagram of a hardware arrangement of the signal tracing control system.

A hardware arrangement for implementing the present invention will be described below. FIG. 3 fragmentarily shows such a hardware arrangement. Denoted at 30 is a PMC (programmable machine controller) having a CPU 31, a ROM 32, a RAM 33, and an interface (INT) 34. The ROM 32 stores a management program for controlling the PMC, a control program for controlling the machine, and the like. The RAM 33 corresponds to the RAM 10 shown in FIG. 1, and the monitored RAM and the tracing buffer are disposed in the RAM 33. The interface 34 receives an input signal (DI) from the machine and transmits an output signal (DO) to the machine. Some of the input and output signals are also sent directly to a computerized numerical control CNC apparatus 40. The CPU 31, the ROM 32, and the RAM 33 are interconnected by a bus. The CNC (computerized numerical control apparatus) apparatus 40 includes a CPU 41 and a common RAM 42.

The PMC 30 and the CNC 40 can exchange data through the common RAM 42. The input signal (DI) from the machine and the output signal (DO) to the machine are temporarily stored in the common RAM 42, and transferred to the PMC 30 and the CNC 40.

The signal monitoring and data writing control, as described above, are effected under the control of the CPU 31.

In the above embodiment, the signal monitoring is effected by monitoring the data stored in the RAM 33 in the PMC 30. However, the signals in the CNC apparatus 40 and the input signal from the machine and the output signal to the machine can also be monitored in the same manner.

With the present invention, as described above, data is monitored for a change, and is stored only when it is changed. Therefore, the monitored data can be stored in a memory having a small storage capacity.

We claim:

1. A signal tracing control system in a programmable machine controller (PMC) for controlling a machine in response to a signal from a numerical control apparatus, comprising:
    a random access memory (RAM);
    monitoring means, coupled to said RAM, for monitoring a signal of said RAM for detecting a change;
    writing control means, coupled to said RAM and said monitoring means, for writing data to said RAM in response to a signal indicative of a change in a signal from said monitoring means; and
    a tracing buffer, coupled to said writing control means, for storing the data of said RAM which is written by said writing control means.

2. A signal tracing control system according to claim 1, wherein said tracing buffer for storing the data of said RAM is a ring configuration.

3. A signal tracing control system for controlling a machine, comprising:
    a programmable machine controller (PMC) including:
        a first microcomputer;
        a read-only memory, coupled to said first microcomputer, for storing a management program for controlling said PMC and a control program for controlling the machine;
        a first random access memory including a tracing buffer; and
        an interface means, coupled to the machine, for receiving signals from the machine and outputting signals to the machine;
    a computerized numerical control (CNC) apparatus, coupled to said programmable machine controller, for receiving the output signals from said interface means, said CNC including:
        a second microcomputer; and
        a second random access memory, coupled to said second microcomputer, said read only memory of said PMC and said interface means, said PMC and said CNC exchanging data through said second random access memory.

4. A signal tracing control system according to claim 3, wherein said tracing buffer has a ring configuration.

5. A method for signal tracing for a programmable machine controller, comprising the steps of:
    (a) storing data in a random access memory;
    (b) monitoring the stored data to detect a change in the stored data; and
    (c) writing data from the random access memory into a tracing buffer when a change in the stored data is detected.

6. A method for signal tracing for a programmable machine controller, comprising the steps of:
    (a) determining whether a signal tracing is to be effected;
    (b) checking the size of an address to be traced;
    (c) checking whether all the bits of the address are changed;
    (d) determining whether an address, that has been changed, is a final address;
    (e) rewriting the address as a first address if the address is a final address;
    (f) incrementing the address by one; and
    (g) writing data into the address.

* * * * *